Figure 1:
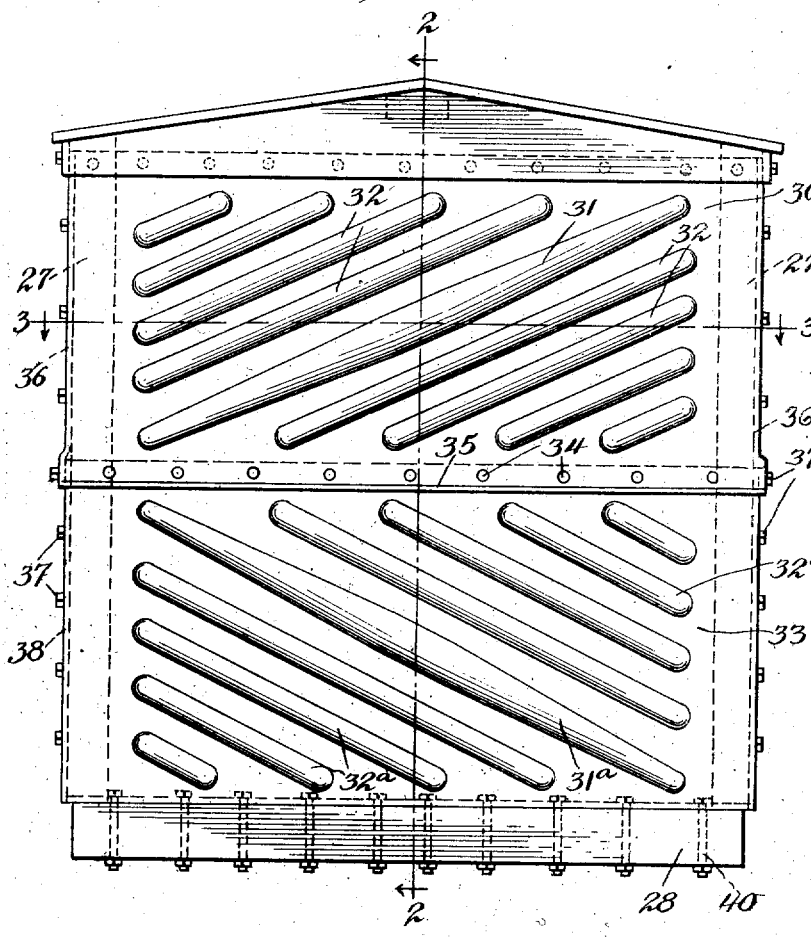

W. P. MURPHY.

METAL END FOR RAILWAY CARS.

APPLICATION FILED FEB. 5, 1918.

Reissued Mar. 26, 1918.

14,449.

2 SHEETS—SHEET 1.

Inventor:
Walter P. Murphy
by
Barnett & Brennan
Attys.

W. P. MURPHY.

METAL END FOR RAILWAY CARS.

APPLICATION FILED FEB. 5, 1918.

Reissued Mar. 26, 1918.

14,449.

2 SHEETS—SHEET 2.

Inventor:
Walter P. Murphy
by
Barnett & Duncan
Attys.

UNITED STATES PATENT OFFICE.

WALTER P. MURPHY, OF NEW YORK, N. Y.

METAL END FOR RAILWAY-CARS.

14,449. Specification of Reissued Letters Patent. Reissued Mar. 26, 1918.

Original No. 1,246,143, dated November 13, 1917, Serial No. 808,818, filed December 26, 1913. Application for reissue filed February 5, 1918. Serial No. 215,468.

*To all whom it may concern:*

Be it known that I, WALTER P. MURPHY, a citizen of the United States, and a resident of New York city, in the county of New York and State of New York, formerly of Chicago, in the county of Cook and State of Illinois, have made certain new and useful Improvements in Metal Ends for Railway-Cars, of which the following is a specification.

My invention relates to the construction of railway cars, particularly, but not necessarily, box cars, and has for its object to provide a novel and improved metal wall, more particularly end, structure for railway cars composed of one or more metal sheets or panels, and provided with reinforcing and stiffening members or devices which may be formed or pressed in the sheet or sheets of metal of which the car is composed, whereby the said wall, while being light and inexpensive to make, will be capable of withstanding the heavy strains and pressures to which the wall of a railway car is subjected when in service and whereby such strains and pressures are transmitted to the framework of the car and distributed as between the vertical and horizontal members thereof.

Additionally, the invention has for an object to provide a sheet metal wall structure for cars with one or more truss-like elements which extend across it, preferably either vertically or horizontally or in both of those directions, and which are wider at their centers than at their ends, or are equivalently constructed, so that they give a maximum amount of strength and stiffness to the sheet or sheets at the place where strength is most needed, to-wit, at the center of the structure; the invention in this respect, when used in the end wall of a car, taking advantage of the fact that under the requirements of the Interstate Commerce Commission there need not be as much clearance between the ends of two railway cars near the center line of the cars as at the sides of the cars where the end ladders are placed.

A further object of the invention is to provide a car wall which, besides being more durable than the ordinary wooden structure, will stiffen and reinforce the entire car body as against weaving and other like stresses tending to distort and strain the same.

The invention has for further objects such other new and improved constructions, arrangements and devices in sheet metal car walls as will be hereinafter described and claimed.

The invention is illustrated in certain preferred embodiments, in the accompanying drawings, wherein—

Figure 2:
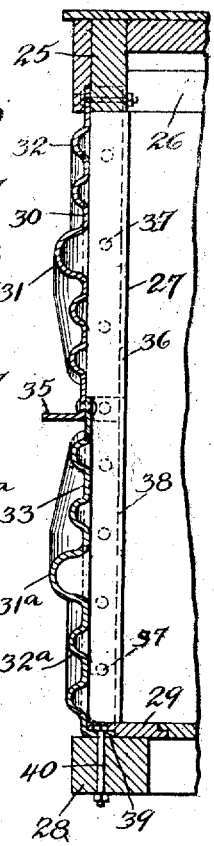
Figure 3:
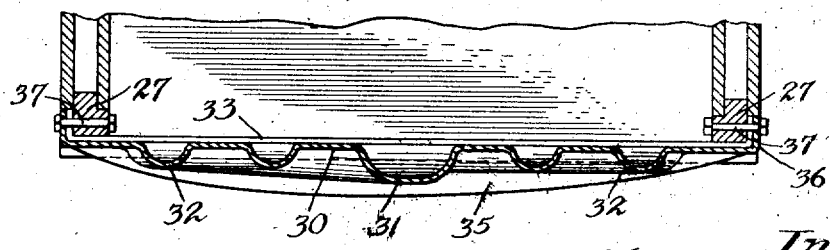
Figure 4:
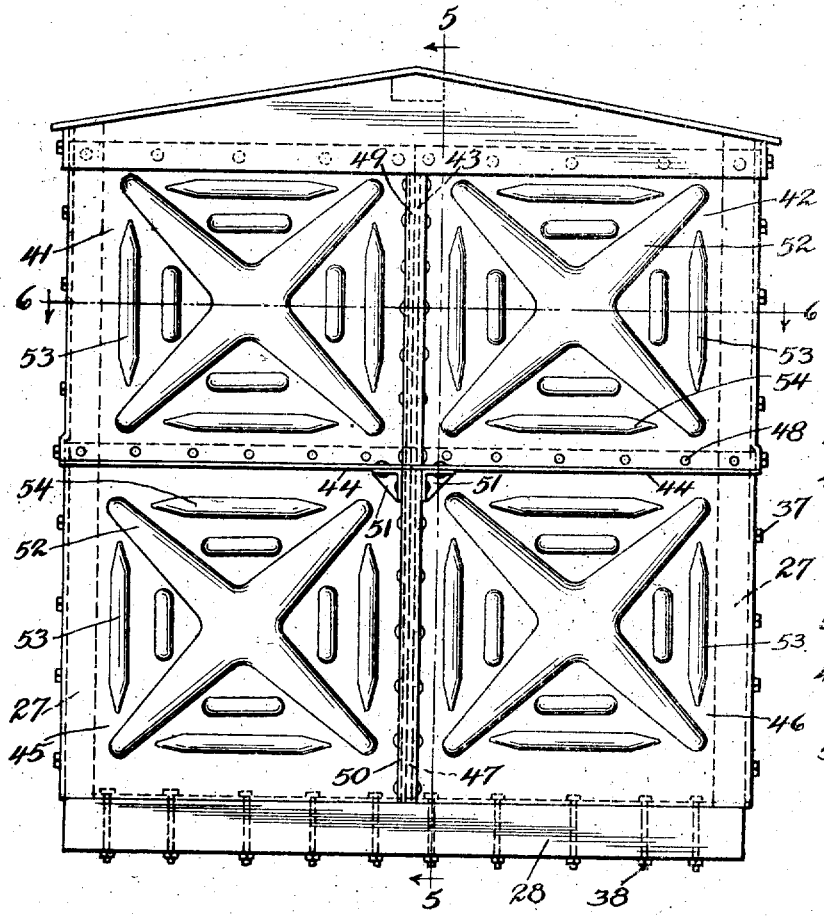
Figure 5:
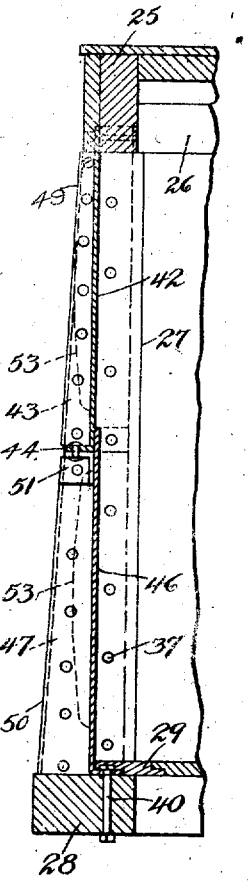

Figure 1 is a view, in elevation, of the end wall of a car, showing the preferred form of construction;

Fig. 2, a sectional view taken on line 2—2 of Fig. 1;

Fig. 3, a sectional view on line 3—3 of Fig. 1;

Fig. 4, an elevation of the end wall of a car illustrating a modification of the structure shown in Figs. 1 to 3 inclusive;

Fig. 5, a sectional view taken on line 5—5 of Fig. 4; and

Figure 6:
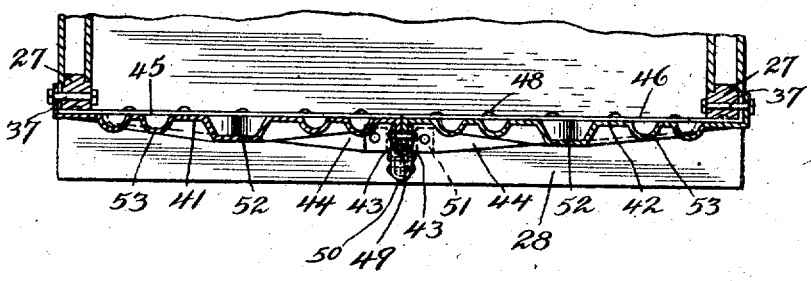

Fig. 6, a sectional view taken on line 6—6 of Fig. 4.

Like characters of reference designate like parts in the several figures of the drawings.

In the drawings, the end plate of the car is designated 25, the side plates 26, the corner posts 27, the end sill 28, and the flooring 29. It will be understood that my invention has nothing to do with the general construction of the car. The wall structure hereinafter described might be used on cars of any ordinary type.

Figs. 1 to 3 inclusive show the preferred form of my invention consisting of one or more, preferably two, sheets reinforced by diagonally extending reinforcing ribs which transmit stresses and pressure against the structure in part to the vertical frame members of the car, the corner posts, and in part to the end sill and end plate of the car, and to an intermediate horizontally disposed truss member which extends across the car from corner post to corner post and forms, in effect, a part of the framing of the car or a reinforcement therefor and for the sheet metal end wall. In these figures the upper sheet designated 30 is formed with a pressed out rib or corrugation 31 which extends diagonally across the sheet and is deeper and wider at the middle than at the ends, and with a plurality of shorter diagonal corrugations 32, these corrugations being preferably parallel, or substantially parallel, to each other; mathematical parallelism being unessential, the purpose of the corrugations being to act as beams to distribute the stresses on the end structure to the vertical and horizontal members of the car framing. The lower sheet 33 is formed with similar corrugations 31ª, 32ª, which preferably extend across the sheet in the opposite direction from the corrugations of the upper sheet. The upper margin of the lower sheet extends back of the upper sheet and is secured thereto by rivets 34. The lower edge of the upper sheet is bent so as to form an outstanding flange 35 which is preferably widest at the middle, tapering down toward its extremities. The upper sheet may be formed with angularly disposed flanges 36 to overlap the corner posts 27 and which may be secured thereto by means of bolts 37. The lower sheet 33 may have similar side flanges 38 which, in a similar manner, may overlap the corner posts 27 and be secured thereto. The lower sheet may also have an inturned flange 39 intervening between the end sill 28 and the flooring 29 and secured thereto by bolts 40.

A modified form of the invention is illustrated in Figs. 4 to 6 inclusive, wherein the end wall consists of two upper sheets 41 and 42 formed on their meeting edges with outstanding flanges 43 and on their lower edges with outstanding flanges 44 and a pair of lower sheets 45 and 46 formed with flanges 47 on their meeting edges, the upper margins of the lower sheets being flat and extending back of the lower edges of the upper sheets where they are secured to the upper sheets by means of rivets 48. The outstanding flanges 44 are preferably widest at their abutting ends and decrease in width toward their outer extremities. The flanges 43 and 47 are preferably sheathed with U-shaped elements 49 and 50 so as to make the joint between the sheets absolutely waterproof. The flanges 47 of the lower sheets are shown as increasing in width toward the bottom. This construction provides an increased reinforcement for the lower part of the end structure, which is naturally subjected to the greatest stress and pressures. The flanges 44 are preferably secured to the flanges 47 by means of angular gussets 51. These gussets serve to combine the flanges 44 into a stiff unitary truss, equivalent in function to the truss member or flange 35. In this modification each sheet is formed with an X corrugation 52 and preferably with vertical corrugations 53 and horizontal corrugations 54. The function of the X corrugation is to transmit stresses on the center portion of the sheet to its corners, that is to say, to the framework of the car and the horizontal and vertical truss members. The horizontal and vertical corrugations stiffen and reinforce the sheets as against local thrusts. In each of the embodiments of the invention disclosed, trusses or reinforcing members are provided which serve particularly to reinforce the center portion of the structure where reinforcement is most required. In each instance advantage is taken of the fact that, when utilizing the structure in the end wall, the center parts of the end of the car may project out further than the side portions to which the end ladders are affixed. It is to be noted that the number of reinforcing or truss members might be increased or diminished in either of the illustrated forms, and these members might be constituted by separate elements where they are shown as provided by the flanging of the sheets. Obviously, also, the number of sheets, which in one case is four and in the other two, may be varied as circumstances require, depending on the type of car to which the end is applied.

Where the car is provided, as herein shown, with reinforcing or truss members running in different directions, and each secured to or integral with the middle of the sheet metal structure, the wall of the car is not only stiff and strong in itself, so as to be capable of withstanding cargo thrusts, but it also serves to reinforce and strengthen the framing of the car as against weaving strains.

In the accompanying drawings and in the foregoing description are set forth certain preferred embodiments of the invention, but it is obvious that one skilled in the art might make modifications thereof without departing from the spirit of the invention.

I claim:

1. A sheet metal end structure for railway cars comprising a panel provided with a truss-like reinforcing member formed by bending one edge of the panel to form a flange which extends across the structure, is relatively wide at the middle and tapers toward its ends.

2. A sheet metal end structure for railway cars made up of a plurality of sheets joined together, the joint of adjacent sheets being provided with a truss-like reinforcing member comprising an angularly disposed flange formed by bending the edge of one sheet which extends across the end structure and is wider at the middle than at its extremities.

3. A sheet metal end structure for railway cars comprising an end sheet formed with a plurality of parallel corrugations one of which extends diagonally substantially from corner to corner across said sheet, and means constituting a reinforcing truss member which extends across said end structure.

4. A sheet metal end structure for railway cars comprising upper and lower end sheets, each formed with a plurality of parallel corrugations which extend diagonally across the sheet, and means for connecting said sheets together, the end of one sheet being bent to provide a truss-like reinforcing member.

5. A sheet metal end structure for railway cars comprising a plurality of end sheets secured to each other at their meeting edges and secured to the framework of the car, each sheet being formed with parallel diagonal corrugations one of which extends substantially from corner to corner across the sheet.

6. A sheet metal end structure for railway cars comprising an upper sheet formed with a corrugation extending diagonally across the sheet substantially from corner to corner and with shorter corrugations on either side of the first named corrugation, a lower sheet formed with a set of corrugations similar to the corrugations of the upper sheet but extending across the sheet in the opposite direction, and means for securing said sheets together and to the framework of the car.

7. A sheet metal end structure for railway cars comprising two end sheets, one of which overlaps the other, the overlapping portion of which is bent to form a reinforcing flange.

8. A sheet metal end structure for railway cars comprising two end sheets, one of which overlaps the other, the overlapping portion of which is bent to form a reinforcing flange which is deepest at the middle and tapers toward its extremities.

9. A sheet metal wall structure for railway cars, comprising upper and lower sheets, each formed with a plurality of parallel corrugations which extend diagonally of the sheet, a truss-like reinforcing flange formed upon that edge of one sheet which meets the other, said sheets being overlapped on their meeting edges and secured together.

10. A sheet metal wall structure for railway cars, comprising upper and lower sheets, each formed with a plurality of parallel corrugations which extend diagonally of the sheet, the upper edge of the lower sheet overlapping the lower edge of the upper sheet upon the inner side thereof, and an outturned truss-like reinforcing flange formed upon the lower overlapping edge of the upper sheet, the overlapping edges of the sheets being secured together.

11. A sheet metal wall structure for railway cars, comprising an upper sheet formed along its lower edge with an outturned reinforcing flange which is widest at the center of the sheet and tapers toward the edges thereof, and a lower sheet the upper edge of which overlaps the inner side of the lower edge of said upper sheet and is secured thereto, each of said sheets being formed with a plurality of parallel corrugations which extend diagonally of the sheet.

12. A sheet metal wall structure for railway cars, comprising an upper sheet formed along its lower edge with an out-turned reinforcing flange which is widest at the center of the sheet and tapers toward the edges thereof, and a lower sheet the upper edge of which overlaps the inner side of the lower edge of said upper sheet and is secured thereto, each of said sheets being formed with a corrugation extending diagonally from corner to corner, and with shorter corrugations on either side of the first named corrugation.

13. A sheet metal wall structure for railway cars, comprising an upper sheet formed along its lower edge with an out-turned reinforcing flange which is widest at the center of the sheet and tapers toward the edges thereof, and a lower sheet the upper edge of which overlaps the inner side of the lower edge of said upper sheet and is secured thereto, each of said sheets being formed with a corrugation extending diagonally from corner to corner, and with shorter corrugations on either side of the first named corrugation, said shorter corrugations paralleling the first named corrugation.

14. A sheet metal wall structure for railway cars, comprising an upper sheet formed along its lower edge with an out-turned reinforcing flange which is widest at the center of the sheet and tapers toward the edges thereof, and a lower sheet the upper edge of which overlaps the inner side of the lower edge of said upper sheet and is secured thereto, each of said sheets being formed with a corrugation extending diagonally from corner to corner, and with shorter corrugations on either side of the first named corrugation, said shorter corrugations paralleling the first named corrugation, the corrugations of one sheet extending in an opposite direction to those of the other.

15. A sheet metal wall structure for railway cars, comprising an upper sheet formed along its lower edge with an out-turned reinforcing flange which is widest at the center of the sheet and tapers toward the edges thereof, and a lower sheet the upper edge of which overlaps the inner side of the lower edge of said upper sheet and is secured thereto, each of said sheets being formed with a currugation extending diagonally from corner to corner, and with shorter corrugations on either side of the first named corrugation, the first named corrugation being deepest at its center portion and tapering toward the corners of the sheet.

16. A sheet metal wall structure for railway cars, comprising an upper sheet formed along its lower edge with an out-turned reinforcing flange which is widest at the center of the sheet and tapers toward the edges thereof, and a lower sheet the upper edge of which overlaps the inner side of the lower edge of said upper sheet and is secured thereto, each of said sheets being formed with a corrugation extending diagonally from corner to corner, and with shorter corrugations on either side of the first named corrugation, the first named corrugation being deepest at its center portion and tapering toward the corners of the sheet, and the first named corrugation of one sheet extending in the opposite direction to that of the other sheet.

17. A sheet metal wall structure for railway cars, comprising a sheet formed with a plurality of parallel diagonally disposed corrugations, one of which extends substantially from corner to corner of the sheet, and means constituting a reinforcing truss member which extends across said structure through the center thereof.

18. A sheet metal wall structure for railway cars comprising a panel formed with an unbroken diagonal corrugation extending substantially from corner to corner of the panel and with independent corrugations parallel to the same.

19. A sheet metal wall structure for railway cars comprising a panel formed with an unbroken diagonal corrugation which extends substantially from corner to corner of the panel, and with a plurality of corrugations parallel thereto.

20. A sheet metal wall structure for railway cars comprising a panel formed with an unbroken diagonal corrugation which extends substantially from corner to corner of the panel and increases in size from its ends toward its center, and with a plurality of corrugations parallel thereto.

21. A sheet metal wall structure for railway cars comprising a panel formed with an unbroken diagonal corrugation extending substantially from corner to corner of the panel, and with corrugations parallel thereto on opposite sides of the same.

22. A sheet metal wall structure for railway cars comprising a panel formed with an unbroken diagonal corrugation which is enlarged from its ends toward its center, and with corrugations parallel thereto on opposite sides of the same.

23. A sheet metal wall structure for railway cars comprising a panel formed with an unbroken diagonal corrugation which extends substantially from corner to corner of the panel and is enlarged from its ends toward its center, and with corrugations parallel thereto on opposite sides of the same.

24. A sheet metal wall structure for railway cars comprising a plurality of panels joined at their meeting edges, each of said panels being formed with an unbroken diagonal corrugation and with a plurality of corrugations parallel thereto.

25. A sheet metal wall structure for railway cars comprising a plurality of panels joined together along their meeting edges, each of said panels being formed with an unbroken diagonal corrugation and with corrugations parallel thereto, the corrugations of one panel extending in a direction inclined with respect to the direction of the corrugations of the adjacent panel.

26. A sheet metal wall structure for railway cars comprising a sheet formed with an unbroken diagonal corrugation which extends substantially from corner to corner of the sheet.

27. A sheet metal wall structure for railway cars comprising a sheet formed with an unbroken diagonal corrugation which extends substantially from corner to corner of the sheet, is largest at its center and tapers toward its extremities.

28. A sheet metal wall structure for railway cars comprising a sheet formed with a plurality of diagonally disposed corrugations, one of which is unbroken and extends substantially from corner to corner of the sheet.

29. A sheet metal wall structure for railway cars, comprising a sheet formed with a plurality of unbroken, diagonally disposed corrugations, one of which extends substantially from corner to corner of the sheet.

30. A sheet metal wall structure for railway cars comprising a sheet formed with a plurality of parallel diagonally disposed corrugations, one of which is unbroken and extends substantially from corner to corner of the sheet.

31. The combination with elements forming a car frame, of a metal sheet adapted to be secured to said frame by its edges, said sheet being formed with a plurality of unbroken, diagonal corrugations, each of which extends substantially from edge to edge of the unsecured area of the sheet, and one of which traverses the center of said area.

32. The combination with elements forming a car frame, of a metal sheet adapted to be secured to said frame by its edges, said sheet being formed with a plurality of parallel unbroken diagonal corrugations, each of which extends substantially from edge to edge of the unsecured area of the sheet.

33. A sheet metal wall structure for railway cars comprising a sheet formed with an unbroken, diagonal corrugation which extends substantially from corner to corner of the sheet, and means constituting a reinforcing truss member which extends across said structure through the center thereof.

34. A sheet metal wall structure for railway cars comprising a sheet formed with an unbroken, diagonal corrugation which extends substantially from corner to corner of the sheet, and means constituting a reinforcing truss member which extends across said structure through the center thereof, said member being formed on the sheet by bending one edge thereof.

35. A sheet metal wall structure for railway cars comprising a sheet formed with an unbroken diagonal corrugation which extends substantially from corner to corner of the sheet, and means constituting a reinforcing truss member which extends across said structure through the center thereof, said member being formed on the sheet by bending one edge thereof, and said corrugation and member being each greatest at its center and tapering toward its extremities.

36. A sheet metal wall structure for railway cars comprising a sheet formed with an unbroken diagonal corrugation which extends substantially from corner to corner of the sheet, is greatest at its center and tapers toward its extremities, and means constituting a reinforcing truss member which extends across said sheet through the center thereof.

37. A sheet metal wall structure for railway cars comprising a sheet formed with a plurality of diagonally disposed corrugations, one of which is unbroken and extends substantially from corner to corner of the sheet, and means constituting a reinforcing member which extends across said structure through the center thereof.

38. A sheet metal wall structure for railway cars, comprising a sheet formed with a plurality of unbroken diagonally disposed corrugations, one of which extends substantially from corner to corner of the sheet, and means constituting a reinforcing truss member which extends across said structure through the center thereof.

39. A sheet metal wall structure for railway cars comprising a sheet formed by a plurality of parallel, diagonally disposed corrugations, one of which is unbroken and extends substantially from corner to corner of the sheet, and means constituting a reinforcing member which extends across said structure through the center thereof.

40. In a railway car, the combination with vertical and horizontal members constituting a part of the framing of the car, of a metal end sheet secured to said framing by its edges and formed with a plurality of substantially parallel corrugations, extending uninterruptedly across the sheet substantially from edge to edge and diagonally arranged so as to distribute the stresses on said sheet in part to the vertical and in part to the horizontal frame members of the car.

41. The combination with the under frame and side walls of a railway car, of a metal end sheet secured to said under frame and side walls, means providing a rigid member extending across the car from side wall to side wall along the upper edge of said end sheet, said sheet being formed with substantially parallel corrugations extending uninterruptedly across the sheet substantially from edge to edge and diagonally arranged so as to distribute stresses on the end sheet as between the side walls, under frame and said rigid member at the upper edge of the sheet.

42. The combination with the under frame and side walls of a railway car, of a metal end sheet secured to said underframe and side walls, means providing a substantially horizontal flange at the upper edge of said sheet; said sheet being formed with non-intersecting corrugations extending uninterruptedly across the sheet from edge to edge and diagonally arranged so as to distribute stresses as between the upper, lower and vertical edges of the sheet.

43. The combination with the under frame and side walls of a railway car, of a metal end sheet secured to said under frame and side walls, means providing a substantially horizontal flange which is widest at the middle and tapers in width toward its ends at the upper edge of said sheet; said sheet being formed with non-intersecting corrugations extending uninterruptedly across the sheet from edge to edge and diagonally arranged so as to distribute stresses as between the upper, lower and vertical edges of the sheet.

44. A sheet metal end structure for a railway car comprising a panel formed with rigidifying corrugations and having a truss-like reinforcement formed by providing a flange at one edge of the sheet which extends across the end structure and is relatively wide at the middle and tapers in width toward its ends.

45. A sheet metal end structure for a railway car comprising an end panel having a truss-like reinforcement formed by providing a flange at one edge of the sheet which extends across the end structure and is relatively wide at the middle and tapers in width toward its ends, said panel being formed with corrugations arranged so as to carry stresses on the panel to said flange.

WALTER P. MURPHY.